United States Patent
Armstrong

[19]

[11] Patent Number: 5,923,891
[45] Date of Patent: Jul. 13, 1999

[54] SYSTEM FOR MINIMIZING DISK ACCESS USING THE COMPUTER MAXIMUM SEEK TIME BETWEEN TWO FURTHEST APART ADDRESSES TO CONTROL THE WAIT PERIOD OF THE PROCESSING ELEMENT

[75] Inventor: James B. Armstrong, Plainsboro, N.J.

[73] Assignee: DIVA Systems Corporation, Menlo Park, Calif.

[21] Appl. No.: 08/818,172

[22] Filed: Mar. 14, 1997

[51] Int. Cl.[6] ................................................. G06F 11/00
[52] U.S. Cl. ..................... 395/800.16; 711/167; 395/552
[58] Field of Search ................................. 395/829, 850, 395/826, 552, 553, 557, 878, 800.16; 711/167, 112

[56] References Cited

U.S. PATENT DOCUMENTS

| | | | |
|---|---|---|---|
| 4,583,133 | 4/1986 | Shoji et al. ................................. | 360/69 |
| 4,871,903 | 10/1989 | Carrell ....................................... | 235/375 |
| 5,581,778 | 12/1996 | Chin et al. ................................. | 395/800 |
| 5,644,786 | 7/1997 | Gallagher et al. ........................ | 395/850 |
| 5,689,678 | 11/1997 | Stallmo et al. ........................... | 711/114 |

*Primary Examiner*—Meng-Ait. An
*Assistant Examiner*—Joseph Schweiss
*Attorney, Agent, or Firm*—Thomason & Moser

[57] ABSTRACT

A method and apparatus for minimizing the cumulative seek time required to complete a plurality of sequential disk accesses within a parallel processing computer system. The method and apparatus orders the disk access requests in an order that ensures that all access requests are fulfilled using two passes of the disk arm across the disk. The method requires the disk controllers or the processing elements to store in memory a queue of N disk access requests and issue each request to the disks asynchronously with respect to disk controllers associated with other processing elements. As such, in a SIMD computer, N disk accesses require a total worst case time of $N \times \tau_{r/w} + \tau_{seek}$ to complete all the accesses.

5 Claims, 3 Drawing Sheets

5,923,891

SYSTEM FOR MINIMIZING DISK ACCESS USING THE COMPUTER MAXIMUM SEEK TIME BETWEEN TWO FURTHEST APART ADDRESSES TO CONTROL THE WAIT PERIOD OF THE PROCESSING ELEMENT

BACKGROUND OF THE DISCLOSURE

1. Field of the Invention

The present invention relates to parallel processing computer systems and, more particularly, to a method and apparatus for minimizing disk drive access time within a parallel processing computer system.

2. Description of the Background Art

The parallel processing computer system described in commonly assigned U.S. Pat. No. 5,581,778 issued Dec. 3, 1996 contains a control unit a plurality of processing elements, a plurality of disk drive units, an interprocessor communications (IPC) bus and a data input/output bus. The control unit is coupled, via an instruction bus, to the plurality of processing elements that are arranged in a parallel manner. Each of the processing elements is coupled to one or more disk drive storage units such that each processing element has its own source of data. The processing elements communicate with one another through the common IPC bus.

In single instruction multiple data (SIMD) operation, the control unit simultaneously broadcasts an instruction stream to all the processing elements and each processing element executes the instructions within the instruction stream in lock step. However, within each of the processing elements the data that is operated upon by the instruction is different and generally recalled from the local disk drive unit. Although all of the processing elements receive the same instruction, not all of the processing elements may be enabled to execute instructions from that instruction stream. As such, the control unit may selectively disable one or more of the processing elements that will not participate in the processing of the current instruction stream.

For those processing elements that are enabled, each element independently requests information from its associated disk drive.

A disk drive access consists of a disk arm seek to an appropriate disk cylinder/track, combined with a read or write (r/w) operation for a particular disk sector in the selected cylinder/track. The time required to complete a disk access is approximately equal to a worst case seek operation, i.e., move the disk arm the distance equal to the radius of the disk. This duration dominates the time to complete a read or write operation for a given disk drive. As such, the execution time of a disk access is data dependent, e.g., the access depends on the sector address relative to the present location of the disk arm. Thus, a disk access requires a variable length of time to be performed on each of the processing elements.

To ensure lock step instruction execution as required in SIMD mode, the control unit broadcasts the next disk access instruction to the processing elements only after they have all completed the current accesses. Therefore, each disk access instruction takes as long as the slowest processing element requires to complete the access request. If some of the processing elements are disabled for a given disk access, they remain idle until each enabled processing element has completed a disk access. When the control unit broadcasts many disk access requests, the overhead associated with each processing element waiting for the longest access to be complete can be significant. For certain applications, a fixed disk input/output rate must be sustained, e.g., video-on-demand applications. As such, a known set of disk access operations must be completed during a fixed interval of time.

More formally, suppose N disk access requests are queued for each interval of time for at least one disk. Let $T_i^k$ represent the time required to complete a disk access i, $0 \leq i < N$, for processing element k. In SIMD mode, the execution time of a sequence of disk accesses is expressed as $$\sum_{i=0}^{n-1}$$

$(T_i^k)$. If the time for a read or write operation equals $\tau_{r/w}$, and the worst case time for a seek operation is $\tau_{seek}$, then the worst case total execution time is $N \times \tau_{r/w} + N \times \tau_{seek}$. Because each processing element waits for the longest disk access to complete before executing the next instruction, a worst case seek time for all processing elements occurs whenever a worst case seek occurs in any one of the processing elements within the parallel processing computer system. Consequently, to avoid asynchronous operation of the processing elements all the processing elements wait for the longest amount of time expected for a seek operation. As such, many of the processors may wait for long periods of time while waiting for the expected longest period of time to expire.

Therefore, a need exists in the art for a method and apparatus that minimizes the disk access time for a parallel processing computer system.

SUMMARY OF THE INVENTION

The disadvantages heretofore associated with the prior art are overcome by the present invention of a method and apparatus for minimizing the cumulative seek time required by a plurality of sequential accesses to individual disk drives within a parallel processing computer system. By minimizing the cumulative seek time of each individual processing element, the overall wait time required for a disk drive to complete a plurality of sequential disk accesses is minimized.

Specifically, the present invention orders and queues the disk access requests. The first embodiment of the invention requires the processing elements to store in local memory (RAM) a queue of N disk access requests and issue each request to the disks asynchronously with respect to disk drive accesses associated with other processing elements. The processing elements sort the disk requests by sector address before issuing the requests to the disk drives. As such, in a SIMD computer, N disk accesses will have a total worst case time of $N \times \tau_{r/w} + \tau_{seek}$. Consequently, the longest time that a processing element must wait until all the processing elements have all completed their disk accesses is substantially reduced from that of the prior art.

In a second embodiment of the invention, the routine for ordering and queuing the disk access requests is performed within a disk processing element within each disk drive unit. Consequently, the processing element can perform other operations while the disk processing elements perform a plurality of disk accesses.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
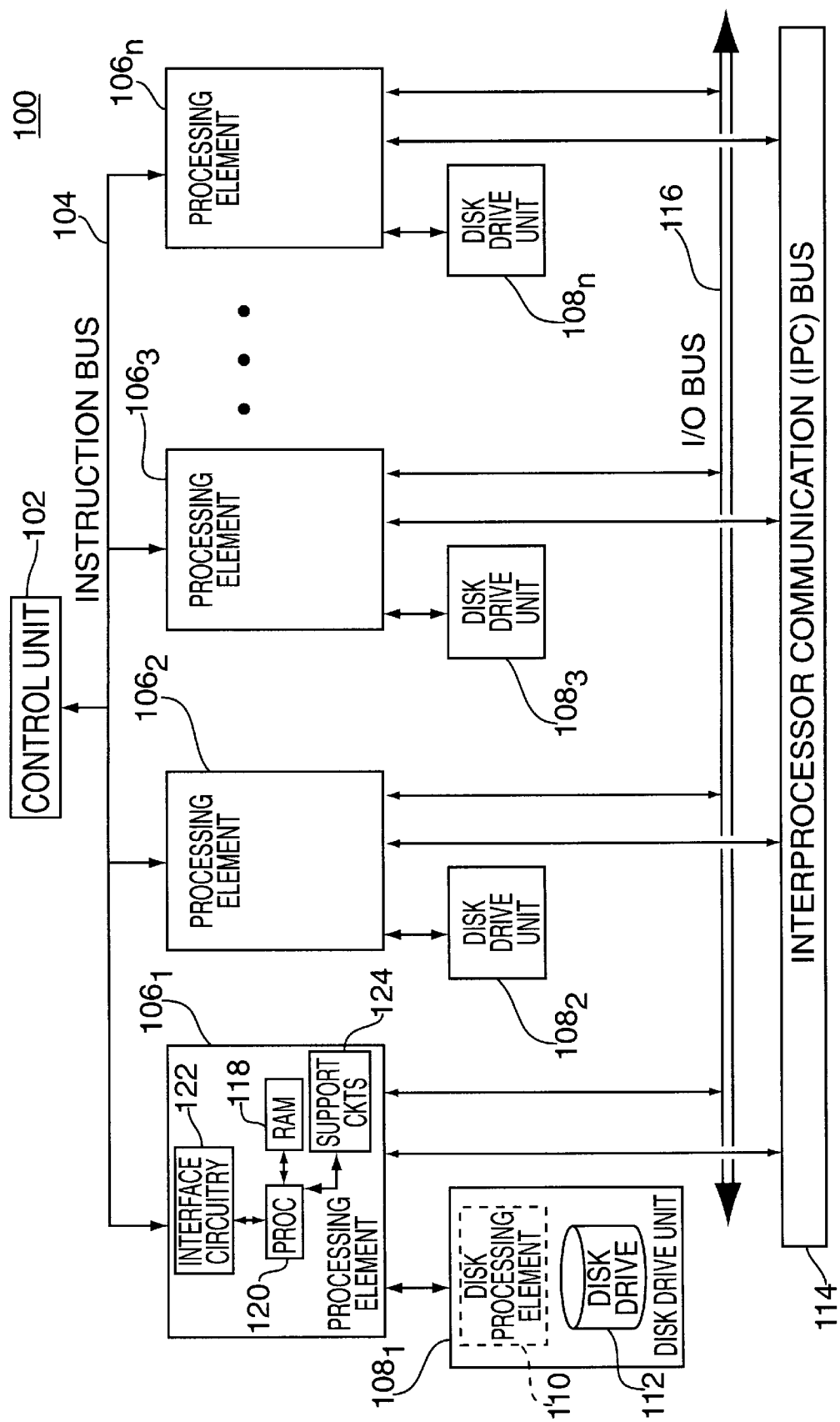
FIG. 1 depicts a block diagram of a parallel processing computer system operated in accordance with the present invention.

FIG. 1 depicts a parallel processing computer 100 that operates in accordance with the present invention. The parallel processing computer 100 contains a control unit 102, a instruction bus 104, a plurality of processing elements $106_n$ (where n is an integer greater than 0), a data input/output (I/O) bus 116, a plurality of disk drive units $108_n$, and interprocessor communication (IPC) bus 114. The control unit 102 is coupled to the plurality of processing elements $106_n$ via the instruction bus 104 through which the control unit broadcasts instructions to all of the processing elements. The processing elements are coupled to the IPC bus 114 as well as the data I/O bus 116 that supplies and receives data to/from each of the processing elements. Furthermore, each of the processing elements is coupled to an associated disk drive unit $108_n$. Each disk drive unit $108_n$ contains a disk drive 112 as well as conventional support circuitry for performing disk accesses. However, disk drive functions and access requests are controlled by the processing element $106_n$ that is connected to the particular drive. In an optional second embodiment of the invention, the disk drive units contain a disk processing element 110 that performs the disk drive control and access functions separate from the processing element $106_n$.

The control unit sends instructions to each of the processing elements $106_n$ and those instructions are performed by each of the processing elements in lock step. Some of the instructions may cause particular processing elements to be disabled and not perform any instructions for a certain period of time, a certain number of instructions, or until an instruction arrives which enables the processing element that was previously disabled. In SIMD operation, the processing elements perform the instructions in lock step as they are presented on the instruction bus. Some of those instructions may cause the processing elements to retrieve or store data from/to the disk drive units. As such, the processing elements that require data access directly access their respective disk drives. In accordance with the present invention, the disk access requests are ordered by the processing element in a manner that optimizes the access time required to read or write data from/to the disk drive unit.

To facilitate ordering and queuing of the disk access requests, each processing element $106_n$ contains a local memory 118, e.g., random access memory (RAM), a processor 120, bus interfaces 122, and well known support circuits 124. The local memory stores a routine that is executed by the processor to order the disk access requests (a disk access request optimization routine 200 of FIG. 2). The local memory also temporarily store (queue) the disk access requests until executed.

In a second embodiment of the invention, a disk processing element $110_n$ is provided in the disk drive unit $108_n$. The disk processing element $110_n$ functions in the same manner as the processing element $106_n$ discussed above with respect to performing disk drive accesses. As such, the processing element $106_n$ performs other tasks while the disk processing element performs the disk accesses.

Figure 2:
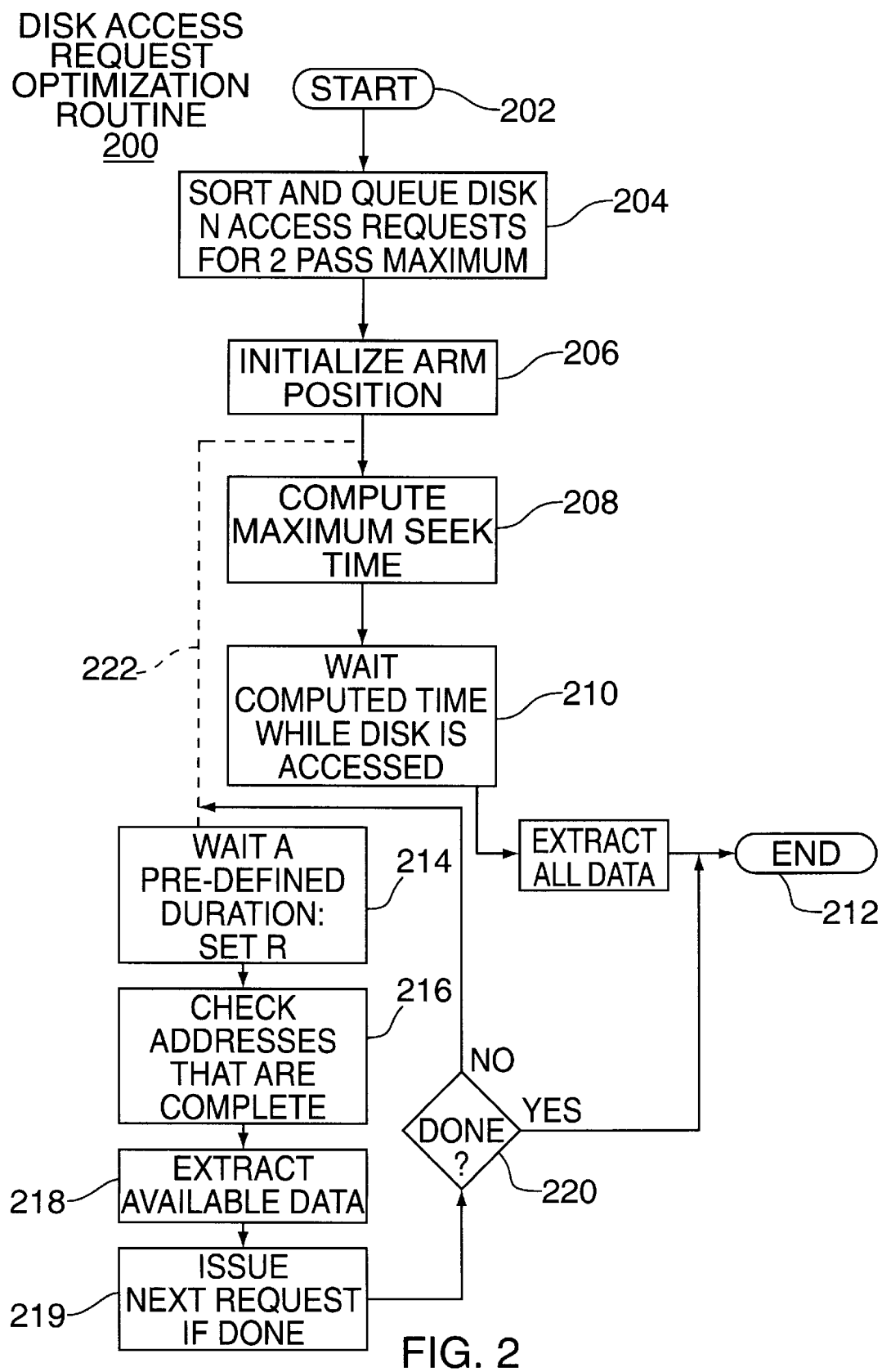
FIG. 2 depicts a flow diagram of a disk access routine in accordance with the present invention.

FIG. 2 depicts a flow diagram of a data request order optimization routine 200 that is generally stored within local memory of the processing element, or the disk processing element, depending on which is to perform the ordering process. The routine begins at step 202 and proceeds to step 204. At step 204, the routine sorts the disk access requests to result in a maximum of two passes of the disk arm across the disk to fulfill all the requests. In general, the routine requires the disk accesses to be ordered in the order in which the data appears or is to be written upon the disk, i.e., all accesses should be accomplished in a single pass of the disk arm across the disk. However, there are exceptions to this general rule. For example, if within one set of data access requests a particular address is to be both written and read, then the ordering process must ensure that the data at that location is written before the data is read from the disk. As such, a single pass across the disk is not always possible for reading and writing all data with a plurality of access requests. Consequently, the data that is to be written must be written on the first pass and then, as the disk arm is moving from the inside to the outside radius or vice versa, the disk drive may read data that was previously written on the previous pass across the disk. The ordered data requests are queued in local memory for later use in performing disk accesses.

At step 206, the routine initializes the arm position typically to either the outer or inner diameter of the disk. However, any known initialization point would suffice. At step 208, the routine computes the time required to seek between the arm positions having the furthest distance between addresses. This time indicates the amount that will be required to complete all of the disk requests within the plurality of requests. At step 210, the routine waits while the disk accesses are completed, i.e., until the computed time has expired, and then the processing element begins using the requested data. If a disk processing element is used, the processing element polls the disk processing element at the end of the computed time for the data. The optimization routine ends at step 212 and awaits the next data access request. This process of optimizing the order in which the disk access requests are accomplished into an order that requires a maximum of two passes of the arm across the disk is referred to herein as an "elevator seek" routine.

A variation of the elevator seek routine is also depicted in FIG. 2. In this optional embodiment, the routine 200 branches along dashed path 222 after initializing the arm position in step 206. Note that in this embodiment of the invention, steps 208 and 210 are not executed.

From path 222, the routine performs step 214, where the routine waits a predefined period of time while a disk access is being accomplished. The predefined period is generally a fractional amount of the total time expected for the routine to fulfill N data accesses, e.g., the total time to complete N accesses is divided into R periodic segments. As the disk drive unit is accessed the data is stored in local memory of the processing element or disk processing element. At the end of the wait period, the routine, at step 216, checks the addresses that have been accessed by the disk drive unit and, at step 218, the processing element extracts, from local memory, any available data resulting from the completed access. As such, the processing element is able to begin using the data while further accesses are accomplished to complete the N data access requests. If the access is complete, the routine issues, at step 219, the next access request in the N data access requests. At step 220, the routine queries whether the routine has accomplished all N disk access requests. If not, then the routine proceeds along the NO path to step 214, where the routine waits for the next predefined period. If the query at step 220 is affirmatively answered, the routine proceeds to step 212 and ends.

This modified routine allows the processing element to accomplish other tasks while performing disk accesses. Once an access request is sent from the sorted and queued N access requests, the processing element periodically checks (polls) addresses at a predefined granularity, i.e., after each R periodic segment. If the address access is complete at any of the polling points, the processing element whose request is completed then issues a next disk access request to its disk drive unit. The process is repeated until all N disk access requests are fulfilled. As such, the modified routine, although not optimal, is substantially improved over the prior art.

Figure 3:
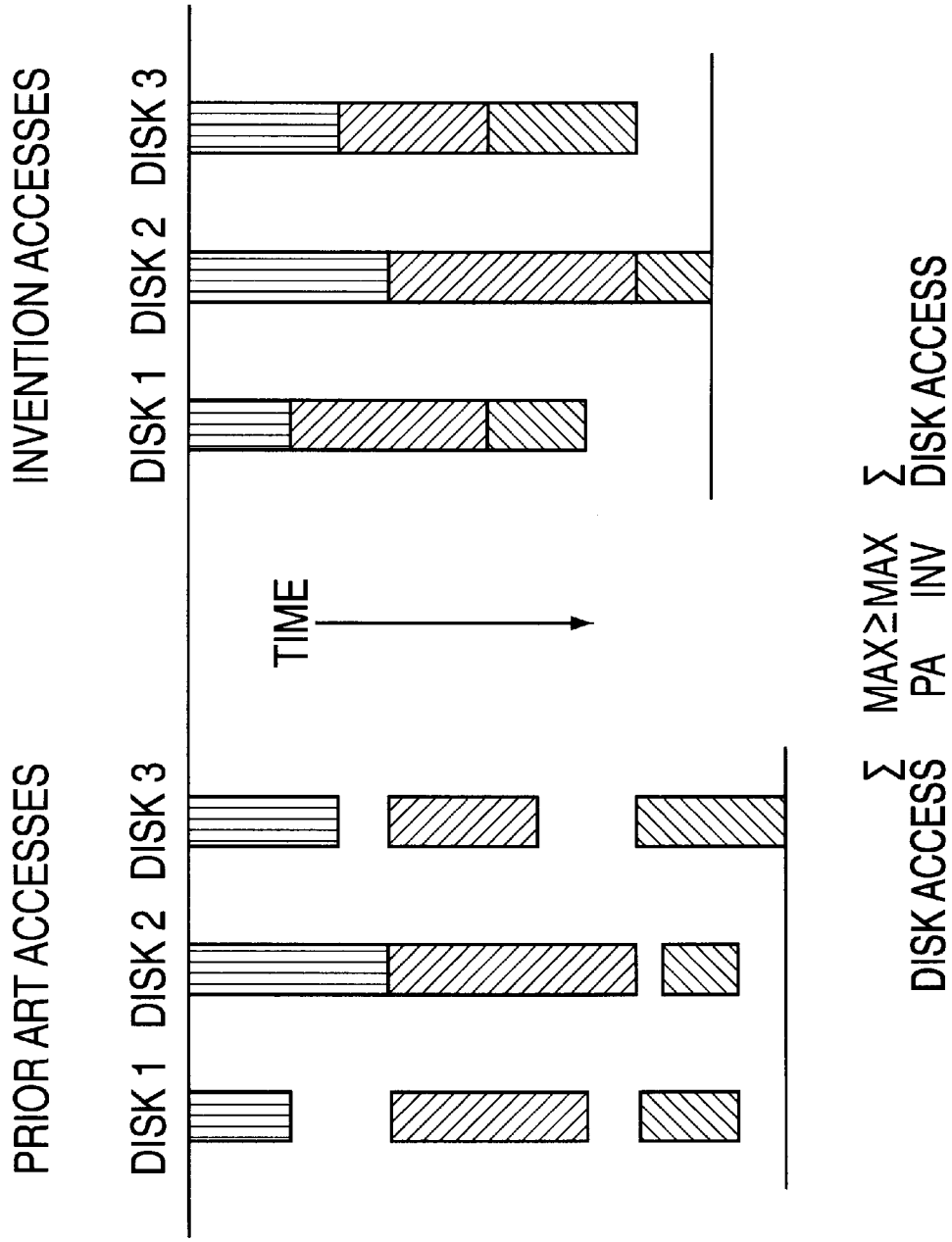
FIG. 3 depicts a timing diagram comparing the prior art timing of a plurality of disk drive accesses versus the timing of a plurality of disk drive accesses in accordance with the present invention.

FIG. 3 depicts a timing diagram comparing the time required to complete a plurality of disk accesses in a prior art system (left side) versus the time required to complete the same plurality of disk accesses using the present invention (right side). In the prior art, all of the processing elements must wait for the longest period of time required by any one access request prior to allowing the processing elements to execute further instructions. As such, out of the three disk drives performing three data requests, disk drive 3 requires the longest period of time to complete its disk accesses and, as such, is the disk drive that controls the duration until the processing elements can perform other tasks. In the present invention, ordering the disk access requests permits the disk drive accesses to be compacted into a shorter amount of time. As such, after the disk accesses are ordered, disk drive 2 requires the most amount of time and now it is the controlling disk drive. However, by ordering the disk accesses, the wait time for the processing elements is substantially less than that shown in the prior art. For example, to complete N disk accesses, the prior art requires a maximum time of $N \times \tau_{r/w} + N \times \tau_{seek}$. While the present invention performs N disk accesses within a maximum time of $N \times \tau_{r/w} + \tau_{seek}$.

Although various embodiments which incorporate the teachings of the present invention have been shown and described in detail herein, those skilled in the art can readily devise many other varied embodiments that still incorporate these teachings.

What is claimed is:

1. In a parallel processing computer system containing a plurality of processing elements and a plurality of disk drive units, where each processing element is connected to a disk drive unit and each processing element issues a plurality of disk access requests to a disk drive unit, a method of optimizing a cumulative disk access request time for a processing element comprising the steps of:

sorting the plurality of disk access requests in an order that assures all disk accesses within said plurality of disk accesses requests are completed using two passes of a disk arm across a disk of a disk drive unit, where said sorting forms a plurality of sorted disk access requests;

queuing the plurality of sorted disk access requests;

computing a maximum seek time defined by the expected duration for the disk arm to move between two addresses within the sorted disk access requests being furthest from one another on the disk;

accessing addresses located on the disk in accordance with the order of said sorted disk access requests to read/write data from said addresses; and storing said data in a local memory waiting the maximum seek time while the addresses are accessed before retrieving said stored data for processing by said processing element.

2. In a parallel processing computer system containing a plurality of processing elements and a plurality of disk drive units, where each processing element is connected to a disk drive unit and each processing element issues a plurality of disk access requests to a disk drive unit, a method of optimizing a cumulative disk access request time for a processing element comprising the steps of:

(a) sorting the plurality of disk access requests in an order that assures all disk accesses within said plurality of disk accesses requests are completed using two passes of a disk arm across a disk of a disk drive unit, where said sorting forms a plurality of sorted disk access requests;

(b) queuing the plurality of sorted disk access requests;

(c) computing a maximum seek time defined by the expected duration for the disk arm to move between two addresses within the sorted disk access requests being furthest from one another on the disk;

(d) accessing an address located on the disk in accordance with said disk access requests to read/write data from said address;

(e) storing said data in a local memory;

(f) repeating steps (c), (d) and (e) for a predefined period of time;

(g) checking, at the end of the predefined period of time, the addresses that are complete;

(h) extracting available data for the completed access requests from the local memory; and (i) repeating steps (c), (d), (e), (f), (g) and (h) until the plurality of disk access requests are complete.

3. In a parallel processing computer system containing a plurality of processing elements and a plurality of disk drive units, where each processing element is connected to a disk drive unit and each processing element issues a plurality of disk access requests to an associated disk drive unit, the disk drive unit contains a disk for storing data at addresses on the disk coupled to a disk processing element, a method of optimizing a cumulative disk access request time for a processing element comprising the steps of:

(a) sorting the plurality of disk access requests in an order that assures all disk accesses within said plurality of disk accesses requests are completed using two passes of a disk arm across the disk of the disk drive unit, where said sorting forms a plurality of sorted disk access requests;

(b) queuing the plurality of sorted disk access requests;

(c) issuing a disk access request from said sorted disk access requests;

(d) accessing an address located on the disk in accordance with the order of said sorted disk access requests to read/write data from said address; and (e) storing said data in a local memory coupled to the disk processing element;

(f) repeating steps (c), (d) and (e) for a predefined period of time;

(g) checking, at the end of the predefined period of time, the addresses that are complete;

(h) extracting available data for the completed access requests from the local memory; and (i) repeating steps (c), (d), (e), (f), (g) and (h) until the plurality of disk access requests are complete.

4. Apparatus for optimizing data request completion time required for each processing element in a parallel processing computer to access data stored in a disk drive unit connected to each processing element, said apparatus comprising:

means for sorting disk access requests to produce an order for the disk drive requests where a disk arm is required to perform a maximum of two passes across a disk to fulfill all the disk drive access requests;

local memory, coupled to said sorting means, for queuing the plurality of sorted disk access requests;

means, coupled to said local memory, for accessing addresses located on the disk in accordance with the order of said sorted disk access requests to read/write data from said addresses and storing said data in said local memory;

means for computing a maximum seek time defined by the expected duration for the disk arm to move between two addresses within the sorted disk access requests being furthest from one another on the disk;

means for waiting the maximum seek time while accessing means accesses said addresses; and means for retrieving said stored data from said local memory for processing by said processing element.

5. Apparatus for optimizing data request completion time required for each processing element in a parallel processing computer to access data stored in a disk drive unit connected to each processing element, said apparatus comprising:

means for sorting the plurality of disk access requests in an order that assures all disk accesses within said plurality of disk accesses requests are completed using two passes of a disk arm across the disk of the disk drive unit, where said sorting forms a plurality of sorted disk access requests;

means for queuing the plurality of sorted disk access requests;

request issuing means for issuing a disk access request from said sorted disk access requests;

accessing means for accessing an address located on the disk in accordance with the order of said sorted disk access requests to read/write data from said address; and storage means for storing said data in a local memory coupled to the disk processing element;

repeating means for repetitively operating said request issuing means, said accessing means and said storage means for a predefined period of time;

monitoring means for checking, at the end of the predefined period of time, the addresses that are complete;

data extraction means for extracting available data for the completed access requests from the local memory; and means for repetitively operating said request issuing means, said accessing means, said storage means, said repeating means, said monitoring means, and said data extraction means until the plurality of disk access requests are complete.

* * * * *

UNITED STATES PATENT AND TRADEMARK OFFICE
CERTIFICATE OF CORRECTION

PATENT NO. : 5,923,891
DATED : July 13, 1999
INVENTOR(S) : Armstrong

It is certified that error appears in the above-identified patent and that said Letters Patent is hereby corrected as shown below:

In the Title of the Application, the word COMPUTER should correctly read: COMPUTED

Signed and Sealed this

Thirtieth Day of November, 1999

Attest:

Q. TODD DICKINSON

Attesting Officer

Acting Commissioner of Patents and Trademarks